United States Patent Office 3,262,950
Patented July 26, 1966

3,262,950
16-METHYLENE-21-HALO-19-NOR-Δ$^{4,6}$-PREGNADIENES
Fred A. Kincl, Atherton, Calif., assignor to Syntex Corporation, Panama, Panama, a corporation of Panama
No Drawing. Filed Dec. 17, 1963, Ser. No. 331,122
5 Claims. (Cl. 260—397.47)

This invention relates to novel cyclopentanopolyhydrophenanthrene derivatives and to processes for their preparation.

More particularly, this invention relates to novel 16-methylene-19-nor-pregnenes and 16-methylene-19-nor-pregnadienes represented by the general formula:

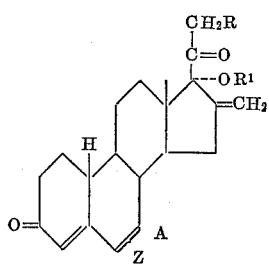

In this formula R represents hydrogen or halogen, e.g., fluorine or chlorine, R$^1$ represents hydrogen or an acyl group containing up to 12 carbon atoms, and Z represents either a double bond or a saturated linkage between the carbon atoms at the 6- and 7-positions.

The acyl groups referred to herein are derived from hydrocarbon carboxylic acids containing less than 12 carbon atoms which may be saturated or unsaturated, of straight, branched, cyclic or cyclicaliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel 16-methylene-19-nor-pregnenes and pregnadienes represented by Formula A hereinabove can also be represented by the following more specific formulas:

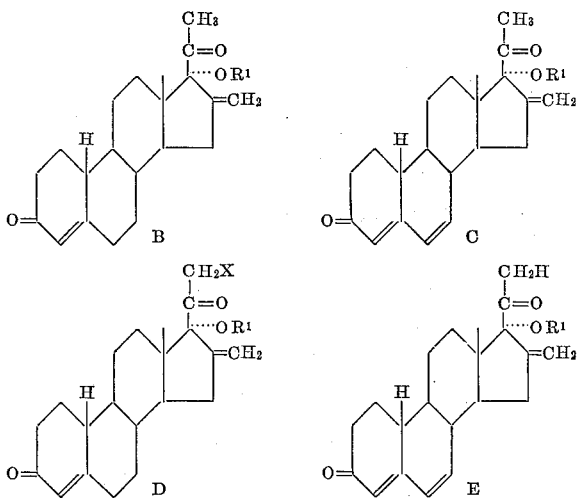

In these formulas R$^1$ is as set forth hereinabove for Formula A, and X represents a halogen atom, e.g., fluorine or chlorine.

The compounds represented by Formula A are progestational agents having anti-androgenic and anti-estrogenic properties, and thus are useful in fertility control.

These compounds can be prepared by a process which can be represented schematically as follows:

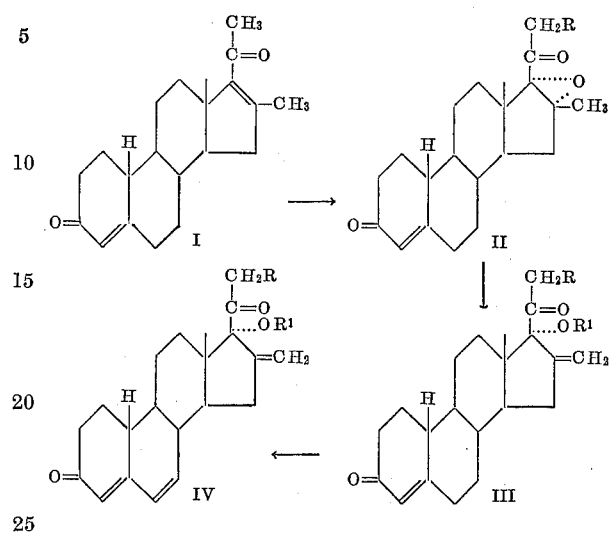

In these formulas R and R$^1$ have the same meanings as set forth hereinabove for Formula A.

In the first step of this process, 16-methyl-19-nor-Δ$^{4,16}$-pregnadiene-3,20-dione (I) is selectively epoxidized at the 16,17-position to give 16β-methyl-16α,17α-oxido-19-nor-Δ$^4$-pregnene-3,20-dione (II; R=hydrogen). This can be accomplished by any of a number of methods known to the art.

Thus, for example, hydrogen peroxide can be admixed with a solution of the starting material dissolved in an inert organic solvent e.g., a lower alkanol, such as methanol or ethanol an aromatic hydrocarbon such as benzene, toluene or xylene, a chlorinated hydrocarbon such as methylene chloride, chloroform or carbon tetrachloride, and the like, as well as mixtures thereof, under alkaline conditions, e.g., in the presence of sodium hydroxide, at a low temperature, e.g., about 15° C. or less, and the resulting reaction mixture can then be allowed to stand at room temperature, or lower, e.g., 0° C. room temperature, overnight to give the 16α,17α-oxido derivative.

Alternatively, the starting material can be dissolved in an inert organic solvent, e.g., one or more of those mentioned above, and then reacted on about a mol for mol basis with an organic peracid of a strong carboxylic acid, e.g., an organic peracid for formic, difluoroacetic, trifluoroacetic or trichloroacetic acid, and the like. This reaction will generally be carried out at a temperature of about 0° C. for from about 10 to 30 minutes, and then at room temperature for from about 1 to 2 hours, in the presence of an alkaline buffering agent, such as sodium bicarbonate, disodium hydrogen phosphate, or the like.

A fluorine or chlorine atom can be introduced at the 21-position immediately following the epoxidation reaction, or after the 16α,17α-oxido ring has been cleaved and the corresponding 16-methylene-17α-hydroxy or 16-methylene-17α-acyloxy compound has been formed, or after a double bond has been introduced at the 6,7-position in said 16-methylene-17α-hydroxy or 16-methylene-17α-acyloxy compound. In any event, the halogen atom can be introduced by any of a number of methods known to the art.

Thus, for example, the particular 21-unsubstituted compound chosen, e.g., 16β-methyl-16α,17α-oxido-19-nor-Δ$^4$-pregnene-3,20-dione, can be dissolved in an inert organic solvent, such as tetrahydrofuran and the like, and then reacted with iodine in the presence of calcium oxide and methanol at room temperature (i.e., about 25° C.) to give the corresponding 21-iodo intermediates, e.g., 21-iodo-16β-methyl - 16α,17α - oxido - 19 - nor-Δ⁴-pregnene-3,20-dione. This 21-iodo intermediate can then be converted to the corresponding 21-fluoro compound, e.g., 21-fluoro-16β-methyl-16α,17α,oxido-19-nor-Δ⁴-pregnene-3,20-dione (II; R=fluorine), by reacting it at room temperature with aqueous silver fluoride in acetonitrile solution.

Similarly, the 21-iodo intermediate can be converted to the corresponding 21-chloro compound, i.e., 21-chloro-16β-methyl-16α,17α-oxido - 19 - nor - Δ⁴ - pregnene-3,20-dione (II; R=chlorine), by dissolving it in an inert organic solvent, e.g., dimethylformamide or the like, and then refluxing it for about 1 to 2 hours with lithium chloride.

In the second step of the process outlined above for preparing the novel 16-methylene-19-nor-pregnenes and pregnadienes of the present invention, the oxido group in 16β-methyl-16α,17α-oxido - 19 - nor-Δ⁴-pregnene-3,20-dione, or in the corresponding 21-fluoro or chloro derivative thereof, is cleaved to provide either the corresponding 16-methylene-17α-hydroxy compound (III; R¹=hydrogen) or a 17-acylate thereof (III; R¹=acyl).

Whether the free 17α-hydroxy compound or a 17α-acyloxy compound is desired, the cleaving reaction will take place in an inert organic solvent of low ionizing power, e.g., an aromatic hydrocarbon such as benzene, toluene or xylene, an ether such as diethyl ether, diisopropyl ether, dioxane or tetrahydrofuran, and the like, or a mixture thereof in which the acid used is not freely ionized. This favors the formation of a high proportion of 16-methylene compound.

To obtain the free 17α-hydroxy compound, the cleaving reaction will be carried out at a temperature of from about 15° C. to about 30° C., and preferably at room temperature, using either a strong mineral acid, such as hydrochloric, hydrobromic, sulfuric or perchloric acid, and the like, or a strong carboxylic acid, such as formic, chloracetic, trichloroacetic or oxalic acid, and the like. Thus, for example, the oxido group in 16β-methyl-16α,17α-oxido-19-nor - Δ⁴ - pregnene-3,20-dione can be cleaved to give 16-methylene-19-nor-Δ⁴-pregnen-17α-ol-3,20-dione, which can then be converted to the corresponding 21-fluoro or chloro derivative, or 21-fluoro-(or 21-chloro)-16β-methyl - 16α,17α - oxido-19-nor-Δ⁴-pregnene-3,20-dione can be reacted to give 21-fluoro-(or 21-chloro-)-16-methylene-19-nor - Δ⁴ - pregnen-17α-ol-3,20-dione.

The corresponding 17α-acyloxy compounds can be obtained by carrying out the cleaving reaction at a temperature of from room temperature or lower, e.g., about 20° C., to 100° C. using an anhydride of a hydrocarbon monocarboxylic acid having less than 12 carbon atoms in the presence of an acid catalyst, e.g., p-toluenesulfonic acid or the like. Thus, for example, the oxido group in 16β-methyl-16α,17α-oxido-19-nor-Δ⁴-pregnene-3,20-dione can be cleaved, using acetic anhydride, to give 16-methylene-19-nor-Δ⁴-pregnen-17α-ol-3,20-dione 17-acetate, which can then be converted to the corresponding 21-fluoro or chloro derivative, while 21-fluoro-(or 21-chloro-)-16β-methyl-16α,17α-oxido-19-nor-Δ⁴-pregnene-3,20-dione, by similar treatment, gives 21-fluoro-(or 21-chloro-)-16-methylene - 19 - nor - Δ⁴ - pregnen-17α-ol-3,20-dione 17-acetate.

The 17-acylates can also be prepared (either directly after the cleaving reaction or after the introduction of a double bond at the 6(7)-position) from the corresponding free 17α-hydroxy compounds by direct acylation, for example by using a mixture of a hydrocarbon monocarboxylic acid and the corresponding anhydride, e.g., a mixture of acetic acid and acetic anhydride, in the presence of p-toluenesulfonic acid.

When introducing fluorine or chlorine at the 21-position after the 16α,17α-oxido ring has been cleaved, the same procedures as those described above for fluorinating or chlorinating the 21-position in the 16α,17α-oxido intermediate can be used. Furthermore, a chlorine atom can also be introduced into 16-methylene-19-nor-Δ⁴-pregnen-17α-ol-3-20-dione by first preparing the corresponding 21-iodo derivative, e.g., by reaction with iodine at room temperature in the presence of calcium oxide, then refluxing this iodo intermediate with freshly fused potassium acetate in acetone for about 8 hours to form the corresponding 21-acetoxy derivative, next saponifying this acetate by conventional means, e.g., by refluxing it with methanolic aqueous sodium hydroxide, potassium hydroxide, potassium carbonate, or the like, to give the corresponding free 21-hydroxy compound, then forming the corresponding 21-mesylate by reacting the free hydroxy compound at room temperature with mesyl chloride in pyridine for about 24 hours, and finally refluxing the thus-obtained 21-mesylate with lithium chloride in dimethylformamide for 1–2 hours.

As illustrated in the third step of the process outlined above, the novel 6-dehydro compounds of the present invention can be prepared from the corresponding 6,7-saturated compounds. Thus, for example, the 6,7-saturated compound, e.g., 16-methylene-19-nor-Δ⁴-pregnen-17α-ol-3,20-dione, can be refluxed with chloranil in t-butanol to give the corresponding 6-dehydro derivative, e.g., 16-methylene-19-nor-Δ⁴,⁶-pregnadien-17α-ol-3,20-dione (IV; R=R¹=hydrogen).

The starting material used in this method of preparing the novel 16-methylene-19-nor-pregnenes and -pregnadienes of the present invention, namely, 16-methyl-19-nor-Δ⁴,¹⁶-pregnadiene-3,20-dione (Compound I in the above reaction sequence) can itself be prepared from diosgenin (Δ⁵-22a-spirosten-3β-ol) or a 3-acylate thereof as shown in the following reaction sequence:

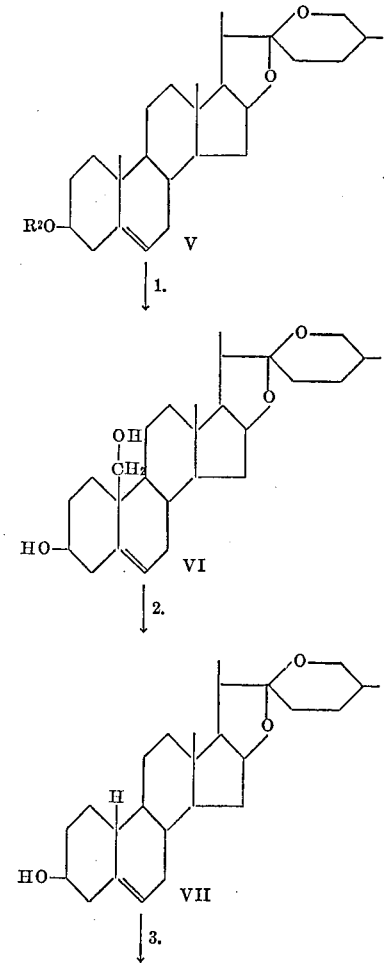

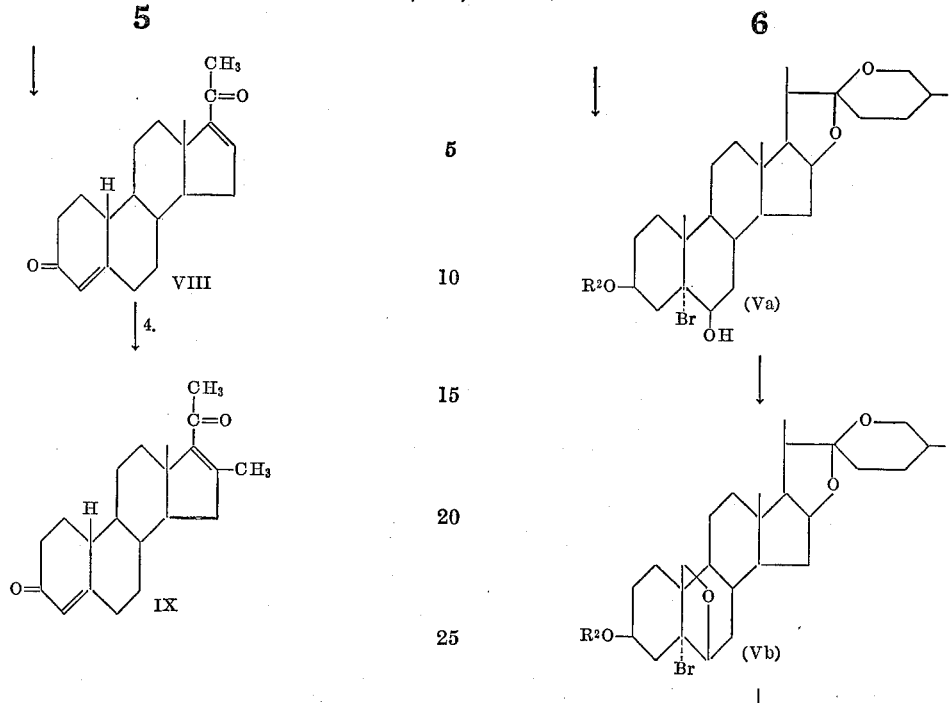

In these formulas R² represents an acyl group.

Step 1 in the general reaction sequence set forth above, namely, going from diosgenin or a 3-acylate thereof to 19-hydroxy diosgenin, will preferably be carried out by either of two methods.

The first of these methods is that described in U.S. Patent No. 3,065,228 to Bowers. A diosgenin 3-acylate, e.g., the acetate (V), is suspended in an inert organic solvent, such as dioxane or the like, then reacted in the absence of light at low temperature, i.e., about 15° C. or less, with N-bromoacetamide in the presence of perchloric acid, and then admixed with an aqueous sodium bisulfite solution, to form the corresponding 3-acylate of 5α-bromo-6β-hydroxytigogenin (Va).

This 5α-bromo-6β-hydroxy compound is then epoxidized to the corresponding 3-acylate of 5α-bromo-6β,19-oxidotigogenin (Vb) by reacting it at reflux temperature in an inert organic solvent, e.g., benzene or the like, with lead tetraacetate. Next, the 6β,19-oxido intermediate is refluxed with zinc dust in ethanol to form the corresponding 3-acylate of 19-hydroxy diosgenin (Vc) and this 3-acylate is then saponified, e.g., using potassium hydroxide in methanol at 0° C. under an inert atmosphere, to give free 19-hydroxy diosgenin (Δ⁵-22a-spirostene-3β,19-diol) (VI).

This method can be represented schematically as follows:

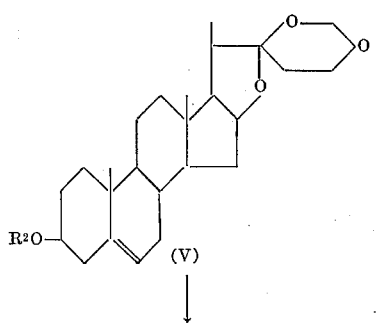

In these formulas R² represents an acyl group.

Another method of preparing 19-hydroxy diosgenin simply involves incubating diosgenin with a mixture of fresh, finely divided animal adrenal tissue and a physiological saline solution containing potassium and magnesium ions and a buffer capable of maintaining a pH of from 6.8 to 7.8, in the manner described in U.S. Patents Nos. 2,671,752 and 3,013,025 to Zaffaroni.

Step 2 in the general reaction sequence set forth above, namely, going from 19-hydroxy diosgenin (VI) to 19-nor-diosgenin (VII), can be carried out by any of the following three preferred methods.

In the first of these methods, 19-hydroxy diosgenin (VI) is dissolved in an inert organic solvent, e.g., acetone or the like, and then by controlled oxidation, i.e., using chromic acid at low temperature, e.g., about 10–15° C. or lower, the 3β-hydroxy group is oxidized to a 3-keto group without migration of the 5,6-double bond, and the 10-hydroxy-methyl group is oxidized to an aldehyde group, thus giving Δ⁵-diosgenon-19-al(Δ⁵-22a-spirosten-19-al-3-one) (X).

Next, this Δ⁵-19-al can be directly converted to 19-nor-diosgenone (19 - nor - Δ⁴ - 22a - spirosten-3-one) (XI)

by dissolving it in a suitable inert organic solvent and then treating it under strongly acidic or basic conditions. For example, the 19-al, dissolved in a lower alkanol, e.g., methanol and the like, can be treated with an aqueous 13% sodium hydroxide solution at a temperature of about 50–70° C. for about 8 hours, or it can be dissolved in a halogenated hydrocarbon solvent, e.g., chloroform or the like, and then treated with a saturated solution of hydrogen chloride in chloroform at room temperature (about 25° C.) for about 30 minutes.

Alternatively, the $\Delta^5$-19-al, dissolved in a lower alkanol, can first be treated with acid under mild conditions, e.g., using a small amount of concentrated hydrochloric acid at room temperature for about 2 hours, to rearrange the 5,6-double bond and produce $\Delta^4$ - diosgenon - 19 - al ($\Delta^4$-22a-spirosten-19-ol-3-one) (XII). This $\Delta^4$-19-al-, dissolved in a lower alkanol, can then be treated under strongly acidic or basic conditions, e.g., those described above in connection with the direct conversion of the $\Delta^5$-19-al, to produce 19-nor-diosgenone (XI).

19-nor-diosgenone (XI) is then converted to the corresponding $\Delta^{3,5}$-enol acylate, e.g., 19-nor-$\Delta^{3,5}$-22a-spirostadien-3-ol 3-acetate (XIII), by first dissolving it in an inert organic solvent, e.g., benzene or the like, and then refluxing it with an isopropenyl acylate, e.g., isopropenyl acetate, in the presence of a small amount of an acidic esterification catalyst, e.g., p-toluenesulfonic acid or the like. This 19-nor-$\Delta^{3,5}$-enol acylate is then reduced, e.g., by dissolving it in an inert organic solvent, e.g., a lower alkanol such as methanol or ethanol, an ether such as diethyl ether or tetrahydrofuran, and the like, as well as mixtures thereof, treating it with sodium borohydride at a temperature of about 0–5° C. for about 3–5 hours, and then adding an aqueous 10% sodium hydroxide solution and refluxing for about 15 minutes, to produce 19-nor-diosgenin (VII).

Another method of going from 19-hydroxy diosgenin to 19-nor-diosgenin involves first subjecting 19-hydroxy diosgenin (VI) to Oppenauer oxidation, e.g., by dissolving this starting material in a mixture of toluene and cyclohexanone and then refluxing the resulting solution with aluminum isopropoxide for from about 5 to 15 minutes, in the manner described in the copending U.S. patent application of Albert Bowers, Serial No. 201,802, filed June 12, 1962, to produce 19-hydroxy diosgenone ($\Delta^4$-22a-spirosten-19-ol-3-one (XIV).

Next, 19-hydroxy diosgenone (XIV) is dissolved in a suitable inert organic solvent and then heated under strongly acidic or basic conditions, e.g., those described hereinabove for the conversion of $\Delta^5$-diosgenon-19-al to 19-nor-diosgenone, and preferably under strongly basic conditions in the manner described in U.S. Patent No. 3,013,025 to Zaffaroni, to produce 19-nor-diosgenone (XI). This latter compound is then converted to 19-nor-diosgenin (VII) in the manner described hereinabove, i.e., by first preparing the corresponding 19-nor-$\Delta^{3,5}$-22a-spirostadien-3-ol-3-acylate, and then reducing this enol acylate.

These first two methods of carrying out step 2 in the above general reaction sequence can be represented schematically as follows:

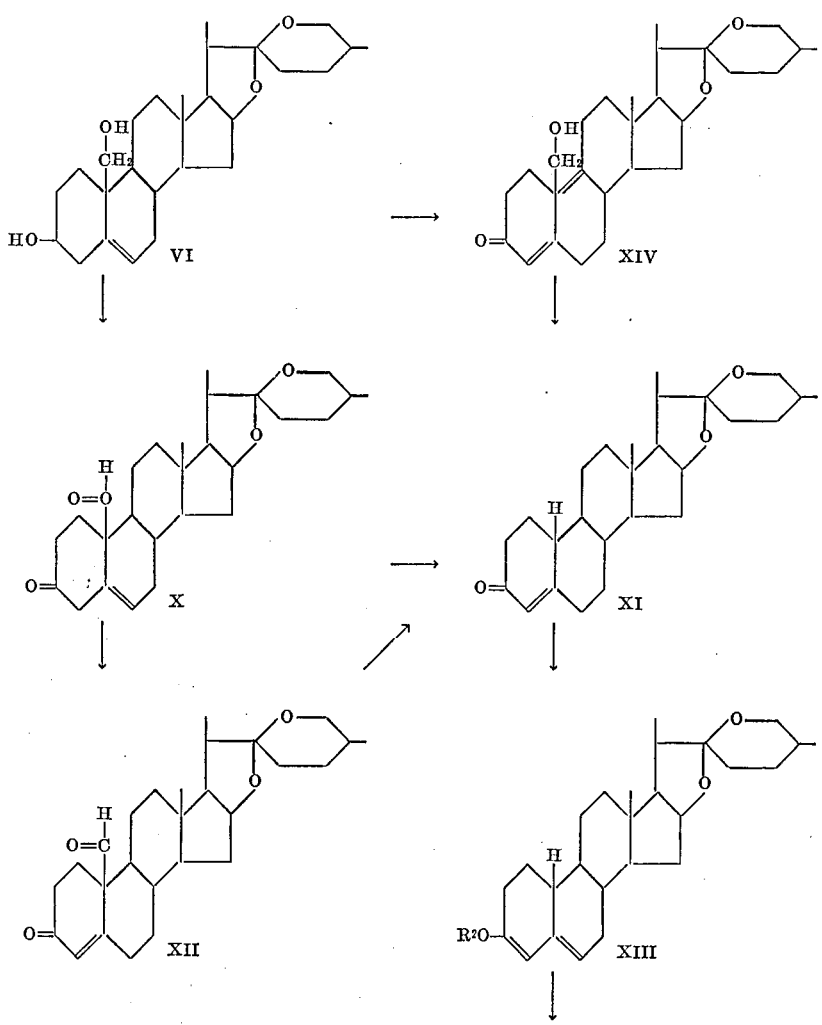

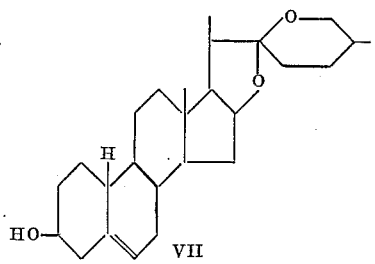

In these formulas R² represents an acyl group.

Still another method of going from 19-hydroxydiosgenin to 19-nor-diosgenin can be represented schematically as follows:

In these formulas R³ represents an acyl group, R⁵ represents hydrogen or an aromatic sulfonyl group, e.g., a methanesulfonyl (mesyl), benzenesulfonyl or toluenesulfonyl (tosyl) group, or the like, and R⁴ represents a lower alkyl group, e.g., a methyl group.

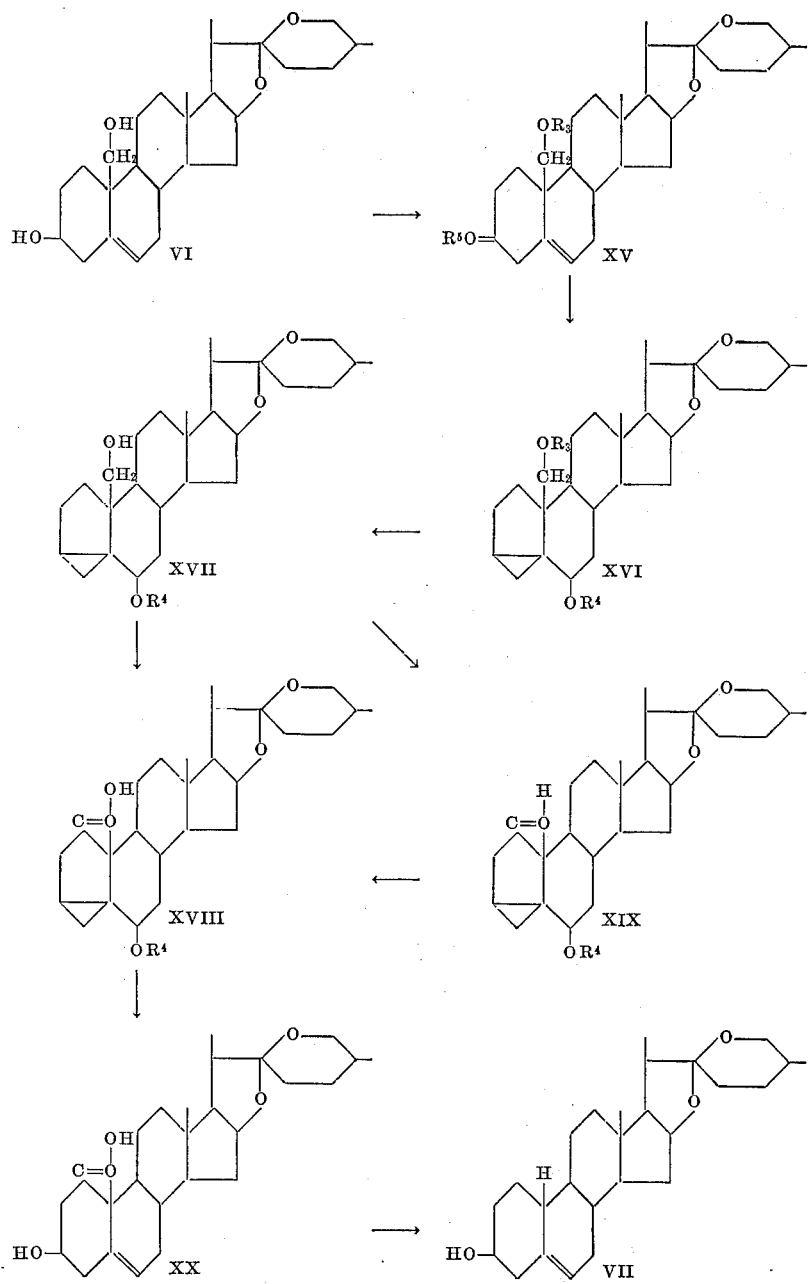

In carrying out this method, 19-hydroxy diosgenin (VI) is first acylated, e.g., by reaction with an acyl anhydride, such as acetic anhydride and the like, in pyridine at low temperature, e.g., 15° C. or less, to form the corresponding 19-monoacylate, e.g., 19-hydroxy diosgenin 19-acetate (XV; $R^5$=H). This 19-monoacylate is then reacted with an aliphatic or aromatic sulfonyl chloride, e.g., tosyl chloride, in anhydrous pyridine at room temperature to form the corresponding aliphatic or aromatic sulfonyloxy derivative, e.g., 19-hydroxy diosgenin 3-tosylate 19-acetate (XV: $R^5$=the tosyl group).

This 3,19-diester, dissolved in a lower alkanol, e.g., methanol, is mixed with freshly fused potassium acetate and then refluxed for about 3 hours to form the corresponding i-lower alkyl ether, e.g., 6-methoxy-22a-i-spirostan-19-ol 19-acetate (XVI). Next, this i-lower alkyl ether is saponified, e.g., by dissolving it in an inert organic solvent, such as a lower alkanol, and refluxing with sodium hydroxide, thus producing the corresponding 19-free hydroxyl compound, e.g., 6-methoxy-22a-i-spirostan-19-ol (XVI).

The 19-hydroxyl group in the latter i-lower alkyl ether is then oxidized, e.g., by dissolving the ether in anhydrous pyridine and treating it at room temperature for about 20 hours, or longer, with a chromium trioxide-pyridine complex (prepared by adding powdered chromium trioxide to anhydrous pyridine, under an inert atmosphere at low temperature, e.g., about 35° C. or less, until the dark red color characteristic of chromic acid disappears), thus producing the corresponding 19-carboxylic acid, e.g., 6-methoxy-22a-i-spirostan-19-carboxylic acid (XVIII).

This oxidation can also be carried out in two stages. The first of these involves dissolving the 6-alkoxy-22a-i-spirostan-19-ol (XVII) in anhydrous pyridine and oxidizing its 19-hydroxyl group, using the stoichiometric amount, or a slight excess thereover, of the aforementioned chromium trioxide-pyridine complex, to give the corresponding 19-aldehyde, e.g., 6-methoxy-22a-i-spirostan-19-ol (XIX). Then, further treatment of this 19-al with an excess of the chromium trioxide-pyridine complex affords the corresponding 19-carboxylic acid (XVIII).

The 6-alkoxy-19-carboxylic acid is then hydrolyzed to give diosgenin 19-carboxylic acid ($\Delta^5$-22a-spirosten-3$\beta$-ol-19-carboxylic acid) (XX). This can be accomplished by dissolving the 6-alkoxy-19-carboxylic acid in an inert organic solvent, e.g., dioxane or the like, and refluxing it with a small amount of acid, e.g., concentrated sulfuric acid. Finally, pyrolysis of diosgenin 19-carboxylic acid, using the method described by Ehrenstein et al., J. Org. Chem., 17, 713 (1952), gives 19-nor-diosgenin (VII). Alternatively, diosgenin 19-carboxylic acid can be refluxed with quinoline and copper chromite to produce 19-nor-diosgenin.

Step 3 in the general reaction sequence set forth above, namely, going from 19-nor-diosgenin (VII) to 19-nor-$\Delta^{4,16}$-pregnadiene-3,20-dione (VIII), is carried out by means of the conventional Marker degradation method [Marker et al., J. Am. Chem. Soc., 61, 3592 (1939); 62, 518 (1940); 69, 2167 (1947)] followed by saponification of the resulting 19-nor-$\Delta^{5,16}$-pregnadien-3$\beta$-ol-20-one 3-acetate and then Oppenauer oxidation of the resulting $\Delta^5$-3$\beta$-ol to the corresponding $\Delta^4$-3-one. This method can be represented schematically as follows:

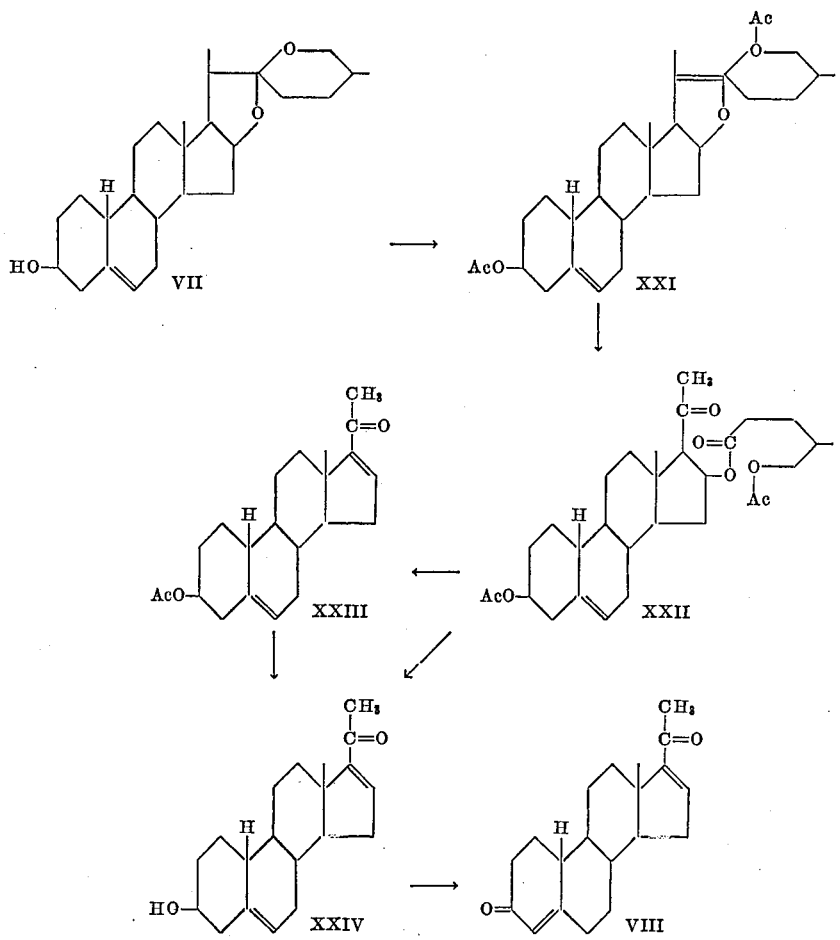

In these formulas, the symbol Ac represents an acetyl radical.

In carrying out this method, 19-nor-diosgenin (VII) and acetic anhydride are admixed and then heated in a sealed tube at a temperature of about 190–195° C. for from about 5–8 hours to give the diacetate of 19-nor-pseudodiosgenin (XXI). Next, water is added to the reaction mixture, and the resulting solution is heated on a steam bath for a short time to destroy excess acetic anhydride. The solution containing the diacetate is then oxidized at low temperature, e.g., about 15° C., with chromic acid to give the corresponding 19-nor-diosone-diacetate (19-nor-$\Delta^5$-pregnene-$3\beta$,16-diol-20-one 3-acetate 16-$\gamma$-methyl-$\delta$-acetoxyvalerate) (XXII).

This 19-nor-diosone diacetate can then be partially hydrolyzed, e.g., by refluxing it with aqueous potassium carbonate in methanol, or with acetic acid, to give 19-nor-$\Delta^{5,16}$-pregnadien-$3\beta$-ol-20-one 3-acetate (XXIII), which can then be completely hydrolyzed, e.g., by refluxing with aqueous potassium hydroxide in acetone, to give the free $3\beta$-ol, i.e., 19-nor-$\Delta^{5,16}$-pregnadien-$3\beta$-ol-20-one (XXIV). Alternatively, the 19-nor-diosone can be fully hydrolyzed in one step, e.g., by refluxing it with a strong base, such as aqueous sodium or potassium hydroxide in acetone, to give the free $3\beta$-ol directly. Conventional Oppenauer oxidation of the free $3\beta$-ol gives the corresponding $\Delta^4$-3-one, i.e., 19-nor-$\Delta^{4,16}$-pregnadiene-3,20-dione (VIII).

Step 4, the final step in the general reaction sequence set forth above, wherein 19-nor-$\Delta^{4,16}$-pregnadiene-3,20-dione (VIII) is converted to 16-methyl-19-nor-$\Delta^{4,16}$-pregnadiene-3,30-dione (IX), is carried out by simply dissolving the starting material in an ethereal solution of diazomethane, letting this solution stand at room temperature for about 24 hours, and then treating, e.g., to about 180° C. or higher, to decompose the 16,17-pyrazoline and form the corresponding 16-methyl-$\Delta^{16}$-compound (IX).

In order that those skilled in the art can more fully understand the present invention, the following examples are set forth. These examples are given solely by way of illustration, and should not be considered as expressing limitations unless so set forth in the appended claims.

PREPARATION A

To a suspension of 10 grams of diosgenin 3-acetate in 10 cc. of dioxane there were added 12 cc. of perchloric acid. Next, light was excluded and 4 grams of N-bromoacetamide were added in portions, with stirring, over a one hour period, the temperature being maintained at approximately 15° C. during this time. Following the addition of the last of the N-bromoacetamide, the reaction mixture was allowed to come to room temperature, and stirring was continued for an additional hour. The reaction mixture was then decolorized by the addition of an aqueous 10% solution of sodium bisulfite. Next, one liter of water was added and the resulting mixture was extracted with methylene chloride. The resulting extract was washed with water and dried over anhydrous sodium sulfate, and the solvent was then evaporated under reduced pressure at room temperature, giving 5$\alpha$-bromo-6$\beta$-hydroxytigogenin 3-acetate.

A solution of 4 grams of this 5$\alpha$-bromo-6$\beta$-hydroxy compound in 150 cc. of dry benzene was admixed with 6 grams of lead tetraacetate, and the resulting reaction mixture was refluxed for 18 hours. Following this reaction period the reaction mixture was cooled and filtered. Next, water was added to the filtrate and the benzene layer was separated, washed with water and then evaporated under reduced pressure. Chromatography of the resulting residue on neutral alumina gave 5$\alpha$-bromo-5$\beta$,19-oxidotigogenin 3-acetate.

Four grams of the thus-obtained 6$\beta$,19-oxido compound in 200 cc. of ethanol were admixed with 20 grams of zinc dust, and the resulting reaction mixture was refluxed for 16 hours. Following this reaction period the reaction mixture was filtered through Celite and the filtrate evaporated to dryness. Crystallization of the resulting residue from acetone-hexane gave 19-hydroxydiosgenin 3-acteate.

Two grams of 19-hydroxydiosgenin 3-acetate, dissolved in 50 cc. of methanol, were admixed with 5 cc. of an aqueous 4% solution of potassium hydroxide. The resulting reaction mixture was stirred at 0° C. for 1 hour under a nitrogen atmosphere, and then neutralized with acetic acid. Next, the methanol was distilled off under reduced pressure, and the resulting residue was triturated with water and then filtered. The solid obtained was washed with water, dried and then crystallized from ethyl acetate-methanol to give 19-hydroxydiosgenin ($\Delta^5$-22a-spirosten-$3\beta$,19-diol).

PREPARATION B

Three cc. of the solvent mixture in a solution of 1 gram of 19-hydroxydiosgenin dissolved in 10 cc. of toluene and 2 cc. of cyclohexanone were distilled off to dry the solution. Next, a solution of 250 mg. of aluminum isopropoxide dissolved in 2 cc. of anhydrous toluene and 0.5 cc. of cyclohexanone was added, and the resulting reaction mixture was refluxed for 10 minutes. Following this reaction period 1 cc. of acetic acid was added and the solvents then removed by steam distillation. The product was extracted several times with ethyl acetate, and the organic extracts were first washed with an aqueous 5% hydrochloric acid solution, next with water, then with an aqueous 10% sodium carbonate solution and finally with water until neutral. The neutral extract was dried over anhydrous sodium sulfate and then evaporated to dryness. Crystallization of the resulting residue from acetone-hexane gave 19-hydroxy-diosgenone ($\Delta^4$-22a-spirosten-19-ol-3-one).

One gram of the thus-obtained 19-hydroxydiosgenone, dissolved in 600 cc. of methanol, was admixed with 250 cc. of an aqueous 13% sodium hydroxide solution. The resulting reaction mixture was heated to 50° C. and maintained at that temperature for 3 hours. The product, which separated from the reaction mixture during this reaction period, was collected by filtration and crystallized from hexane, giving 19-nordiosgenone (19-nor-$\Delta^4$-22a-spirosten-3-one).

Ten cc. of the solvent mixture in a solution of 4 grams of 19-nordiosgenone in 100 cc. of benzene was distilled off in order to remove traces of moisture. Next, 20 cc. of isopropenyl acetate and 800 mg. of p-toluenesulfonic acid were added, and the resulting reaction mixture was refluxed for 2 hours. At this point, an additional 20 cc. of isopropenyl acetate was added, and refluxing was then continued for 2½ hours more. During the reaction period the reaction mixture had been concentrated to approximately two-thirds of its original volume. The reaction mixture was then poured into water, extracted with ether, washed with an aqueous 5% sodium bicarbonate solution and then with water, dried over anhydrous sodium sulfate and finally concentrated to a small volume. The addition of pentane to this small volume of solution caused crystallization of 19-nor-$\Delta^{3,5}$-22a-spirostadien-3-ol 3-acetate.

A solution of 2 grams of this enol acetate in 300 cc. of methanol and 100 cc. of diethyl ether was cooled in an ice bath. Next, a solution of 4 grams of sodium borohydride in 100 cc. of methanol was added dropwise, with vigorous stirring, over a one hour period, following which the reaction mixture was kept at 0° C. for 5 hours. Next, acetic acid was added dropwise to the reaction mixture to destroy excess sodium borohydride, and the solution was then concentrated under vacuum to a volume of approximately 50 cc. Dilution of this concentrated solution with water caused precipitation of crude 19-nordiosgenin (19-nor-$\Delta^5$-22a-spirosten-$3\beta$-ol), which was then purified by recrystallization from acetone.

PREPARATION C

A mixture of 10 grams of 19-nordiosgenin and 40 cc. of acetic anhydride was heated at a temperature of 195°

C. for 5 hours in a sealed tube. Following this reaction period the tube was cooled and the contents were poured into an Erlenmeyer flask. Next, water was added cautiously, and the solution was then heated on a steam bath for 30 minutes to destroy excess acetic anhydride.

The solution was then cooled to about 15° C. and 50 cc. of a precooled solution of chromium trioxide in 90% acetic acid (prepared by dissolving 4.2 grams of chromium trioxide in 54.5 cc. of 90% acetic acid) were added, with stirring. The resulting reaction mixture was then stirred for an additional 30 minutes, following which the excess of chromium trioxide present was destroyed by the addition of an aqueous sodium bisulfite solution. The mixture was then poured into water and extracted with ethyl acetate. The extracts obtained were washed with water, next with an aqueous sodium bicarbonate solution, then with water to neutral, and finally dried over anhydrous sodium sulfate and evaporated to dryness, thus giving the crude 19-nor-diosone diacetate (19-nor-$\Delta^5$-pregnene - 3$\beta$,16-diol-20-one-3-acetate 16-$\gamma$-methyl-$\delta$-acetoxy valerate).

The thus-obtained 19-nor-diosone diacetate was then admixed with 500 cc. of aqueous 60% acetone containing 5 grams of potassium hydroxide and refluxed for 5 hours. Following this reaction period the reaction mixture was poured into water and thoroughly extracted with ethyl acetate. The aqueous layer was then acidified and reextracted with ethyl acetate. The combined extracts were then dried over anhydrous sodium hydroxide and evaporated to dryness, thus giving 19-nor-$\Delta^{5,16}$-pregnadien-3$\beta$-ol-20-one.

A solution of 5 grams of this $\Delta^{5,16}$-diene in 50 cc. of toluene and 10 cc. of cyclohexanone was dried by distilling of 10 cc. of the solvent mixture. Next, a solution of 1.25 grams of aluminum isopropoxide in 10 cc. of anhydrous toluene and 3 cc. of cyclohexanone was added, and the resulting reaction mixture was refluxed for 15 minutes. Following this reaction period 5 cc. of acetic acid were added, and the solvents were removed by steam distillation. After extracting the product several times with ethyl acetate the extracts were combined and washed with an aqueous 5% hydrochloric acid solution, next with water, then with an aqueous 10% sodium carbonate solution and finally with water until neutral. The neutral extract was dried over anhydrous sodium sulfate and evaporated to dryness. Crystallization of the dry residue from acetone-hexane gave 19-nor-$\Delta^{4,16}$-pregnadiene-3,20-dione.

PREPARATION D

One gram of 19-nor-$\Delta^{4,16}$-pregnadiene-3-20-dione was dissolved in 30 cc. of an etheral solution of diazomethane and then allowed to stand at room temperature for 24 hours. Following this reaction period 1 cc. of acetic acid was added to destroy excess diazomethane, and the solvent was then evaporated under reduced pressure to give the dry, crude 16,17-pyrazoline, which was decomposed by heating gradually to 180° C. under vacuum. Recrystallization of the resulting crude product from acetone-hexane gave 16-methyl-19-nor-$\Delta^{4,16}$-pregnadiene-3,20-dione.

Example I

A solution of 5 grams of 16-methyl-19-nor-$\Delta^{4,16}$-pregnadiene-3,20-dione in 150 cc. of methanol was cooled to 15° C. Next, 20 cc. of an aqueous 4 N solution of sodium hydroxide and 20 cc. of hydrogen peroxide were added, with stirring and with the temperature being maintained at 15° C. during this addition. The resulting reaction mixture was then kept at 0° C. overnight, following which is was poured into ice water. The precipitate formed thereby was filtered, washed with water and dried. Recrystallization from acetone-hexane gave 16$\beta$-methyl-16$\alpha$,17$\alpha$-oxido-19-nor-$\Delta^4$-pregnene-3,20-dione.

Example II

A cooled, continuously stirred solution of the thus-prepared 16$\beta$ - methyl-16$\alpha$,17$\alpha$-oxido-19-nor-$\Delta^4$-pregnene-3,20-dione in a mixture of 30 cc. of tetrahydrofuran and 18 cc. of methanol was treated first with 6 grams of calcium oxide, added in small portions, and then with 6 grams of iodine. Then, stirring was continued at room temperature until the reaction mixture turned pale yellow. At this point, the mixture was poured into ice water containing 18 cc. of acetic acid and 2 grams of sodium thiosulfate and, after stirring for 15 minutes, the solution was decanted and the precipitate was collected by filtration, thus giving 21-iodo-16$\beta$-methyl-16$\alpha$,17$\alpha$-oxido-19-nor-$\Delta^4$-pregnene-3,20-dione.

This 21-iodo intermediate was dried under vacuum and then dissolved in 20 cc. of acetonitrile. To this solution there was added dropwise 1.4 grams of silver fluoride dissolved in 3 cc. of water. After a short time, silver iodide started to separate, leaving the desired 21-fluoro-$\Delta^4$-pregnene derivative in solution. The reaction mixture was kept at room temperature for 24 hours, then filtered. Concentration of the filtrate under vacuum gave a crude product which, after crystallization from acetone-methanol, gave 21-fluoro-16$\beta$-methyl-16$\alpha$,17$\alpha$-oxido-19-nor-$\Delta^4$-pregnene-3,20-dione.

Example III

A suspension of 10 grams of lithium chloride in 50 cc. of dimethylformamide was heated to boiling. Next, a solution of 2 grams of 21-iodo-16$\beta$-methyl-16$\alpha$,17$\alpha$-oxido-19-nor-$\Delta^4$-pregnene-3,20-dione in 10 cc. of dimethylformamide was added, and the resulting reaction mixture was refluxed for 2 hours. Following this reaction period, the reaction mixture was cooled and poured into water, and the thus-formed precipitate was filtered off and crystallized from acetone-hexane to give 21-chloro-16$\beta$-methyl-16$\alpha$,17$\alpha$-oxido-19-nor - $\Delta^4$ - pregnene - 3,20-dione.

Example IV

A mixture of 1.2 grams of 16$\beta$-methyl-16$\alpha$,17$\alpha$-oxido-19-nor-$\Delta^4$-pregnene-3,20-dione, 15 ml. of trifluoroacetic acid and 10 ml. of benzene was allowed to stand at room temperature for 2 hours. Following this reaction period water was added, and the resulting mixture was extracted with methylene chloride. The organic extract was washed with an aqueous 5% potassium bicarbonate solution, then with a saturated sodium chloride solution, and then dried over anhydrous magnesium sulfate. Crystallization from acetone-diethyl ether gave 16-methylene-19-nor-$\Delta^4$-pregnen-17$\alpha$-ol-3,20-dione.

Examples V and VI

The procedure employed in Example IV was repeated in every detail in each of these examples with one exception, namely, 16$\beta$-methyl-16$\alpha$,17$\alpha$-oxido-19-nor-$\Delta^4$-pregnene-3,20-dione was replaced by 21-fluoro-16$\beta$-methyl-16$\alpha$,17$\alpha$-oxido-19-nor-$\Delta^4$-pregnene-3,20-dione and 21-chloro - 16$\beta$ - methyl - 16$\alpha$,17$\alpha$-oxido-19-nor-$\Delta^4$-pregnene-3,20-dione, respectively. In each case, the corresponding 16-methylene-17$\alpha$-hydroxy derivative, namely, 21-fluoro-16 - methylene - 19-nor-$\Delta^4$-pregnen-17$\alpha$-ol-3,20-dione and 21 - chloro - 16-methylene-19-nor-$\Delta^4$-pregnen-17$\alpha$-ol-3,20-dione, respectively, was obtained.

Example VII

One gram of p-toluenesulfonic acid monohydrate, 50 cc. of acetic acid and 25 cc. of acetic anhydride were added to 1 gram of 16-methylene-19-nor-$\Delta^4$-pregnen-17$\alpha$-ol-3,20-dione, and this reaction mixture was then held at room temperature for 24 hours. Following this reaction period, the reaction mixture was poured into water and stirred until excess acetic anhydride had been hydrolyzed. Isolation of the product by extraction with methylene chloride followed by crystallization from acetone-diethyl ether gave 16-methylene-19-nor-$\Delta^4$-pregnen-17α-ol-3,20-dione 17-acetate.

*Examples VIII and IX*

The procedure of Example VII was repeated in each of these examples in every detail but one, namely, 16-methylene-19-nor-$\Delta^4$-pregnen-17α-ol-3,20 dione was replaced by 21-fluoro-16-methylene-19-nor-$\Delta^4$-pregnen-17α-ol-3,20-dione and 21-chloro-16-methylene-19-nor-$\Delta^4$-pregnen-17α-ol-3,20-dione, respectively. In each case, the corresponding 17-acetate, namely, 21-fluoro-16-methylene-19-nor-$\Delta^4$-pregnen-17α-ol-3,20-dione 17-acetate and 21-chloro-16-methylene-19-nor-$\Delta^4$-pregnen-17α-ol-3,20-dione 17-acetate, respectively, was obtained.

*Example X*

To a solution of 1 gram of 16β-methyl-16α,17α-oxido-19-nor-$\Delta^4$-pregnene-3,20-dione in 10 ml. of benzene there were added, with stirring, 5 ml. of acetic anhydride and 0.1 gram of p-toluenesulfonic acid. The resulting reaction mixture was maintained at 20° C. for 4 hours, with continuous stirring. Following this reaction period the reaction mixture was poured into water and stirred to destroy excess acetic anhydride and precipitate the product. The precipitate was collected by filtration, washed with water, dried and then crystallized from aqueous methanol containing a trace of pyridine to give 16-methylene-19-nor-$\Delta^4$-pregnen-17α-ol-3,20-dione 17-acetate, identical with the product of Example VII hereinabove.

*Example XI*

A mixture of 1 gram of 16-methylene-19-nor-$\Delta^4$-pregnen-17α-ol-3,20-dione, 2 grams of chloranil and 50 cc. of t-butanol was refluxed for 8 hours. Following this reaction period the reaction mixture was cooled and the unreacted chloranil was filtered off and washed several times with ethyl acetate. These washings were added to the filtrate and the combined organic solution was washed with a cold aqueous 10% sodium hydroxide solution until the washings were colorless. The organic layer (chiefly ethyl acetate, containing the product) was dried over anhydrous sodium sulfate and then evaporated to dryness. The resulting dry residue was dissolved in methylene chloride-diethyl ether, decolorized with alumina, and then crystallized to give 16-methylene-19-nor-$\Delta^{4,6}$-pregnadien-17α-ol-3,20-dione.

*Examples XII–XVI*

By repeating the procedure of Example XI using 21-fluoro-16-methylene-19-nor-$\Delta^4$-pregnen-17α-ol-3,20-dione, 21-chloro-16-methylene-19-nor-$\Delta^4$-pregnen-17α-ol-3,20-dione, 16-methylene-19-nor-$\Delta^4$-pregnen-17α-ol-3,20-dione 17-acetate, 21-fluoro-16-methylene-19-nor-$\Delta^4$-pregnen-17α-ol-3,20-dione 17-acetate and 21-chloro-16-methylene-19-nor-$\Delta^4$-pregnen-17α-ol-3,20-dione 17-acetate, respectively, in place of 16-methylene-19-nor-$\Delta^4$-pregnen-17α-ol-3,20-dione, the corresponding $\Delta^{4,6}$-dienes, namely, 21-fluoro-16-methylene-19-nor-$\Delta^{4,6}$-pregnadien-17α-ol-3,20-dione, 21-chloro-16-methylene-19-nor-$\Delta^{4,6}$-pregnadien-17α-ol-3,20-dione, 16-methylene-19-nor-$\Delta^{4,6}$-pregnadien-17α-ol-3,20-dione 17-acetate, 21-fluoro-16-methylene-19-nor-$\Delta^{4,6}$-pregnadien-17α-ol-3,20-dione 17-acetate and 21-chloro-16-methylene-19-nor-$\Delta^{4,6}$-pregnadien-17α-ol-3,20-dione 17-acetate, respectively, were obtained.

It will be obvious to those skilled in the art that other changes and variations can be made in carrying out the present invention without departing from the spirit and scope thereof as defined in the appended claims.

I claim:

1. A compound represented by the general formula:

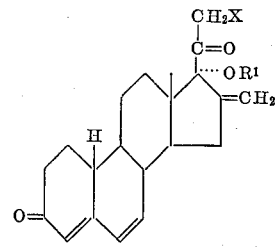

wherein X is selected from the group consisting of fluorine and chlorine and $R^1$ is selected from the group consisting of hydrogen and an acyl group containing up to 12 carbon atoms.

2. 21-fluoro-16-methylene-19-nor-$\Delta^{4,6}$-pregnadien-17α-ol-3,20-dione.

3. 21-chloro-16-methylene-19-nor-$\Delta^{4,6}$-pregnadien-17α-ol-3,20-dione.

4. 21-fluoro-16-methylene-19-nor-$\Delta^{4,6}$-pregnadien-17α-ol-3,20-dione 17-acetate.

5. 21-chloro-16-methylene-19-nor-$\Delta^{4,6}$-pregnadien-17α-ol-3,20-dione 17-acetate.

References Cited by the Examiner

UNITED STATES PATENTS

| | | | |
|---|---|---|---|
| 3,113,143 | 12/1963 | Bork et al. | 260—397.4 |
| 3,168,537 | 2/1965 | Oliveto et al. | 260—397.4 |

LEWIS GOTTS, *Primary Examiner.*

ELBERT L. ROBERTS, *Examiner.*